United States Patent [19]

Whiteside et al.

[11] Patent Number: 4,630,915
[45] Date of Patent: Dec. 23, 1986

[54] MULTIPART CASSETTE FOR TWO COMPONENT FILM SYSTEM

[75] Inventors: George D. Whiteside, Lexington; Robert E. Cavallaro, Norwood, both of Mass.

[73] Assignee: Polaroid Corporation, Cambridge, Mass.

[21] Appl. No.: 747,901

[22] Filed: Jun. 24, 1985

[51] Int. Cl.⁴ .................... G03B 17/26; G03B 17/50
[52] U.S. Cl. ................................ 354/275; 354/86; 354/301; 354/318; 242/71.2
[58] Field of Search .............. 354/84, 85, 86, 87, 354/88, 275, 301, 302, 303, 318; 242/71.1, 71.2, 71.7

[56] References Cited

U.S. PATENT DOCUMENTS

| | | | |
|---|---|---|---|
| 3,128,058 | 4/1964 | Ringle et al. | 242/71.7 |
| 3,138,084 | 6/1964 | Harvey | 95/31 |
| 3,238,858 | 3/1966 | Eloranta | 95/13 |
| 3,314,791 | 4/1967 | Cotta et al. | 96/76 |
| 3,314,792 | 4/1967 | Land | 96/76 |
| 3,347,142 | 10/1967 | Steisslinger | 354/275 |
| 3,476,027 | 11/1969 | Southern | 242/71.2 |
| 3,907,563 | 9/1975 | Land | 96/3 |
| 3,955,771 | 5/1976 | Ishii et al. | 242/71.2 |
| 4,307,955 | 12/1981 | Cocco et al. | 354/303 |
| 4,325,624 | 4/1982 | Pedroli | 354/304 |
| 4,420,120 | 12/1983 | Raymond | 242/71.7 |

Primary Examiner—A. A. Mathews
Attorney, Agent, or Firm—David R. Thornton

[57] ABSTRACT

A cassette for a photographic film system adapted for processing after exposure by face-to-face contact of the negative with a positive processing film, the cassette having multi-part first and second chambers for containing the respective roll film elements at opposite ends of a central tray-like support. The negative film element, being light sensitive, may be packaged in a light-tight chamber defined by one of the two housings. The packaged negative element and cassette part defined thereby may be subsequently joined to a positive film chamber or loaded with a processing film element which, being insensitive to light, is preferably loaded under daylight conditions. After assembly of the film elements in the cassette, leading ends of both are connected so that in operation, film elements may be drawn simultaneously from their respective chambers for processing.

10 Claims, 8 Drawing Figures

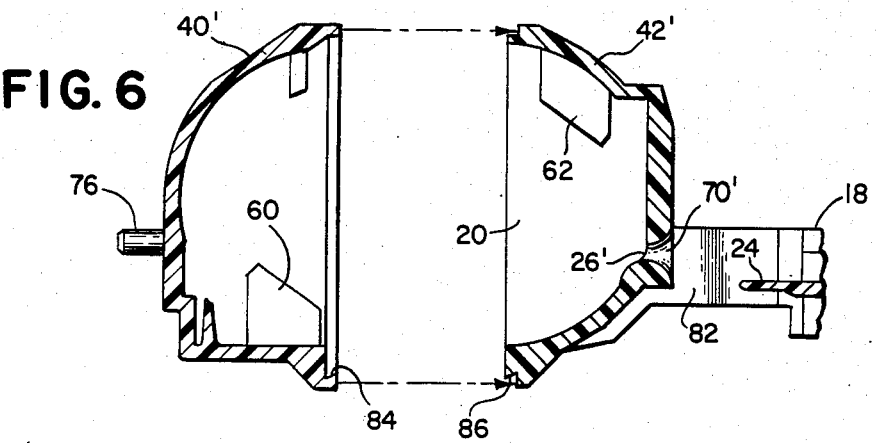
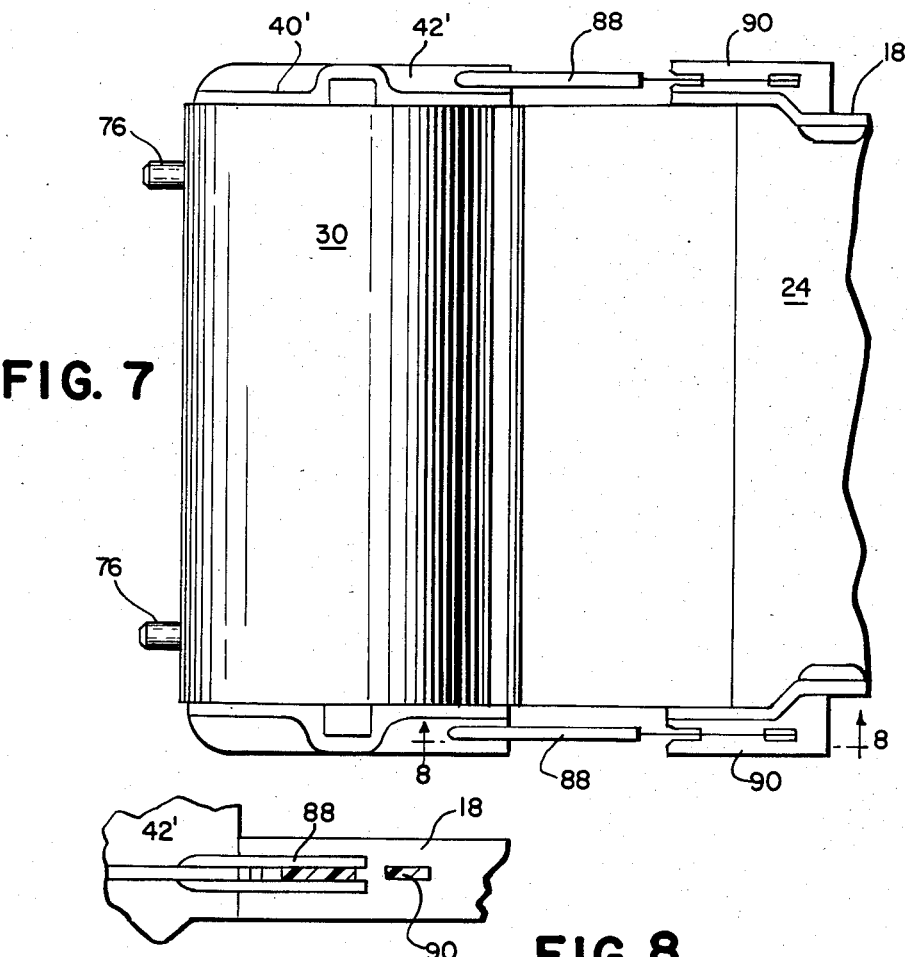

MULTIPART CASSETTE FOR TWO COMPONENT FILM SYSTEM

BACKGROUND OF THE INVENTION

This invention relates to photographic film cassettes and, more particularly, it concerns a multipart film cassette structure and method of assembly particularly suited for two component film systems having unique requirements for handling not only during manufacture, but also during packaging and storage up to the time the two film components are processed to provide a photographic image.

Commonly assigned U.S. Pat. No. 3,907,563 issued to Edwin H. Land on Sept. 23, 1975, discloses a diffusion transfer process in which the image-receiving element or sheet is impregnated with an alkaline processing composition. The image receiver or positive sheet includes a transparent support through which the final image may be observed in an image-receiving coating or layer directly on the transparent support. Reflectivity for use of the system as a positive print is provided by a white pigmented layer backed by an opaque layer. The three layers thus provided on the transparent support are impregnated with a liquid alkaline processing agent common to diffusion transfer film processing.

The negative element of the system disclosed in the aforementioned patent includes a support of mylar or similar material which may be either transparent or opaque. The negative support is coated by a polymeric acid layer, a timing layer, a dye developer layer and finally a silver halide layer. After exposure of the silver halide layer on the negative, the two sheets are brought together in intimate face-to-face contact as a laminate with the several coatings situated between the respective negative and positive sheet supports. The processing agent operates to transfer the latent image formed by exposure of the silver halide layer of the negative to the image-receiving layer directly behind the transparent support of the receiver sheet. The acid layer in the original negative sheet neutralizes the alkaline processing fluid, but under the control of the timing interlayer situated between the acid layer and the remaining layers of the composite laminate.

The diffusion transfer system disclosed in U.S. Pat. No. 3,907,563 is especially attractive from the standpoint of attaining high quality photographs with virtually no added requirements for assuring uniformity of processing fluid spread between the respective negative and positive elements other than impregnation of the positive element during manufacture. In this respect, it is to be noted that in substantially all commercially available diffusion transfer film systems, the alkaline processing fluid is initially contained by a rupturable pod, carried as a component of the film assembly, to be spread between the negative and positive elements of the film assembly after negative exposure. The uniformity of the spread requries precision not only in the processing apparatus, which is incorporated as a part of a camera or equivalent, but also a sophisticated and expensive combination of elements in the film sheet assembly itself.

While a film system of the type disclosed in U.S. Pat. No. 3,907,563 has potential for significant reduction in costs over current diffusion transfer systems, particularly in the manufacture of film, use of such film on a commercial basis is not without problems. Because of the strongly alkaline character of the processing agent and the need for its neutralization after processing, the components carrying the processing agent and the neutralizing acid layer must be kept separate until the processing step is performed. Also, it is important that the liquid processing agent in the positive sheet element be kept from evaporization and that the pH level of the liquid be maintained. Moreover, these conditions must be maintained not only for the normal shelf life of commercial photographic film, but also after the film is loaded into and stored in the camera.

In a copending U.S. application entitled "Method and Apparatus for Photographic Film System with Web Carried Processing Liquid", patent application Ser. No. 747,899 filed herewith, the aforementioned problems are addressed by the provision of a cassette system in which separate chambers are provided on opposite ends of a central tray-like section to receive the respective negative and processing element of the film system. The central tray-like section serves to retain the negative element of the system in an exposure plane, and the processing web chamber or positive chamber is equipped with a releasable stopper to ensure that the positive element, coated or otherwise wetted with a liquid processing agent, is hermetically encapsulated at all times other than during passage of the positive element from the chamber.

While the system disclosed in the aforementioned copending application shows great potential for commercial adaptation of the described two component film system, there is need for structural adaptation of the cassette system to low cost construction and/or assembly as well as to the discrete peculiarities of the positive and negative elements of such film systems. For example, the negative element of the film system is light sensitive and therefore must be manufactured and handled through packaging in plant facilities by experienced personnel using specialized equipment incident to the handling of light-sensitive material. Also, that portion of the cassette structure employed to house the negative element must be made from materials configured exclusively to the maintenance of a dark chamber for the negative film element. The processing web or positive is not light sensitive, but must be maintained at all times under conditions which prevent or inhibit the evaporation of the liquid processing agent. As a result of this latter characteristic, packaging assembly of the positive element in the cassette is more complex. Therefore, packaging of the positive element cannot only accommodate, but also requires different assembly equipment than that required for packaging the negative element. Also, the positive element, in general, is most efectively handled with visible access in light from which the negative must remain protected.

SUMMARY OF THE INVENTION

In accordance with the invention, unique subassemblies are provided which separate the loading in the dark of photosensitive material from other assembly requirements. In the preferred embodiment, the unique characteristics and requirements of the respective processing elements and photosensitive element of a two component film sytem of the type disclosed in U.S. Pat. No. 3,907,563 are advantageously utilized in a cassette assembly by a multi-part cassette structure which facilitates separate loading of the two elements. As a result of the multi-part cassette structure, certain of the elements may be handled or utilized as subassemblies at one plant or location whereas other elements may be handled at another plant or location.

The invention is preferably embodied in a cassette structure, having a tray-like support on which the negative is retained in a flat configuration for exposure and which carries a pair of film slotted housings at opposite ends. In the preferred embodiments, each of the housings include at least two parts for establishing slotted chambers for receiving the respective negative and positive elements of the film system. The housing defining the negative chamber is light-tight and one of the two parts thereof may be an integral extension of the support. Thus, the negative film element, in a coiled configuration, is loaded into the negative chamber in the dark with its leader extended through the slot, the chamber closed and the negative film element protected thereafter from exposure to light. The loading of the negative film element is carried out under conditions protected from light by personnel using equipment in plant facilities designed for the handling and packaging of light sensitive negative film. While the specification refers to positive film, it should be noted that an important aspect of such positive is that it is a wet processing web and in some applications need not, in fact, carry a typical positive layer.

In the preferred embodiments, the cassette assembly, including the packaged negative film element is completed in the light by loading and closing the housing defining the processing web or positive film chamber. The positive film chamber housing may include one part integral with the support or may be attachable as a closed film containing unit to the support. In either case, the positive film chamber housing is of material selected to be impervious to air and moisture in order to prevent contamination of or evaporation of liquid processing agent coated on or otherwise carried with the web, or that is, the positive film element. Because the processing agent and positive film element are not sensitive to light, they may be loaded in daylight under conditions and with equipment best suited to the loading and handling thereof. After both housings have been assembled in a cassette, the respective ends of the film elements are connected together and the cassette packaged for distribution and use.

A principal object of the present invention, therefore, is to provide a multi-part casette and method for handling and packaging film in a dual housing cassette or for handling and packaging the respective film elements of a two element film system in which the individual elements have diverse and unique handling packaging requirements. Other objects and further scope of applicability of the present invention will become apparent from the detailed description to follow taken in conjunction with the accompanying drawings in which like parts are designated by like reference numerals.

BRIEF DESCRIPTION OF THE DRAWINGS

FIG. 6 is an exploded fragmentary cross-section illustrating an alternative embodiment of the invention;

FIG. 7 is a fragmentary plan view illustrating still another embodiment of the invention; and FIG. 8 is an enlarged fragmentary cross-section on line 8—8 of FIG. 7.

DESCRIPTION OF THE PREFERRED EMBODIMENTS

Figure 1:
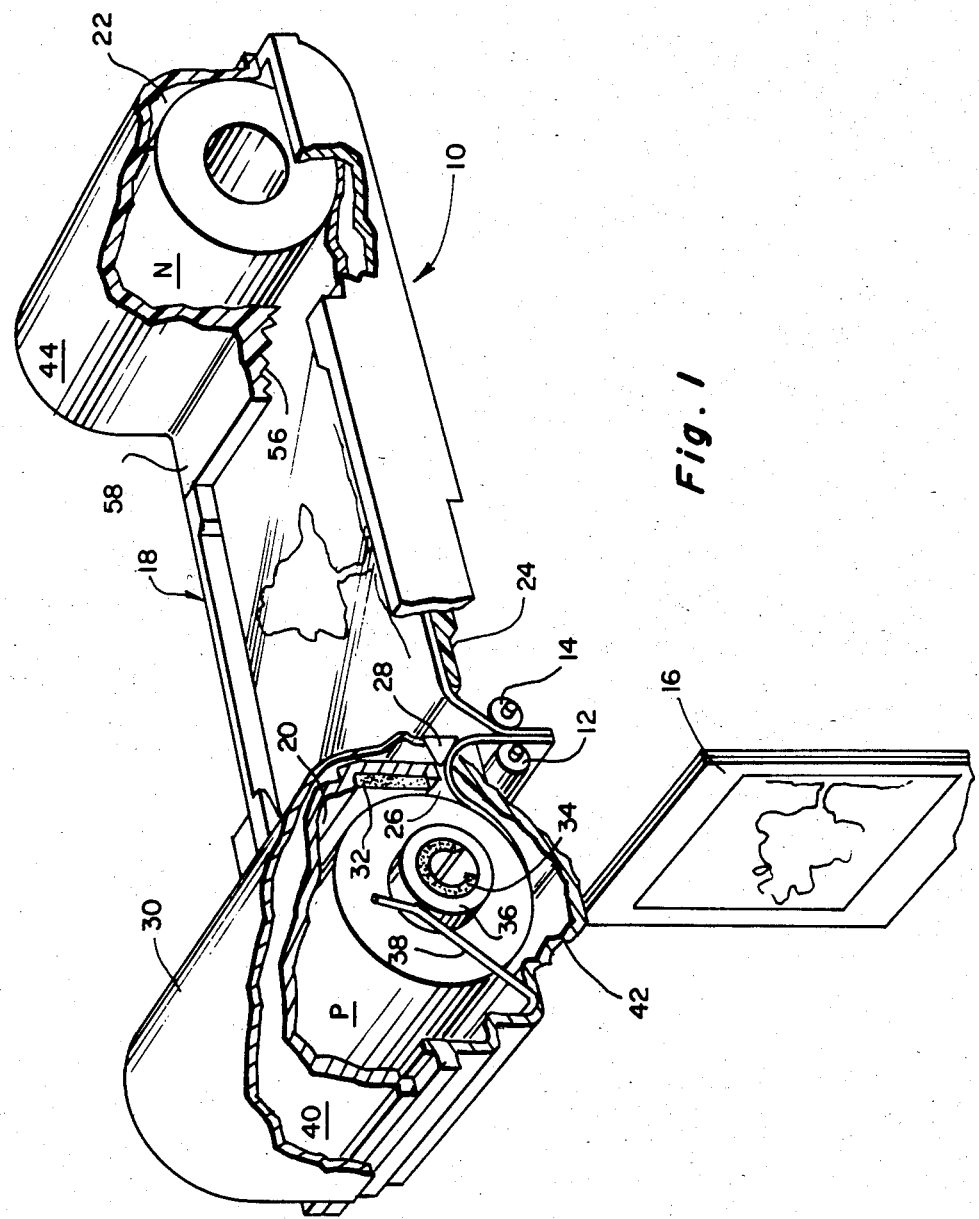
FIG. 1 is a perspective view in partial cross-section illustrating an embodiment of a film cassette in accordance with the present invention loaded with a two element film system.

In FIG. 1 of the drawings, an embodiment of the invention is shown to include a multi-element film cassette 10 loaded with a photosensitive film or negative film element N and a processing web or positive film element P. The cassette is depicted in FIG. 1 as it would be positioned in a camera for exposure of the negative film element N and for processing by passage of both elements N and P through the nip of two rollers 12 and 14 to provide a photograph 16. One or both of the rollers 12 and 14 may be supported by camera structure (not shown) in which the cassette 10 is to be used. As described in the aforementioned copending patent application Ser. No. 747,899 the positive film element carries a liquid processing agent which is effective to transfer a latent image formed on the film element N to an image receiving layer on the positive element P where the resulting positive image may be observed through a transparent substrate forming part of the positive element P. It should be noted that while the present embodiment is intended to provide reflective prints and carries the positive in the film element P, other arrangements, including transparencies, may be provided by the system and the element P may merely be a processing web.

The general structural organization of the cassette 10 is similar to the cassette disclosed in the aforementioned copending application in that it includes a central tray-like support 18 carrying slotted chambers 20 and 22 at opposite ends for receiving the respective film elements P and N. The support 18 includes a flat deck or floor 24 for supporting the negative film element N in a flat configuration for exposure and presents an unobstructed area at least as large as an image frame to be presented to the film system.

The positive film chamber 20 includes a slot-like opening 26 through which the positive film element P is passed for processing contact with the negative film element N at the nip between the rollers 12 and 14. Means are also carried by the chamber 20 for releasably closing or releasably sealing the opening 26 and comprise an elastomeric stopper 28 carried by a biasing means such as a semi-cylindrical leaf spring 30. As a result of the stopper 28, the chamber 20 for the positive film element is essentially sealed from the atmosphere at all times except during processing feed of the positive film element P from the chamber. The chamber 20 preferably includes a donor element or pad such as an absorbent strip 32 adjacent the opening 26 to be impregnated with water or other sacrificial liquid to inhibit evaporation of liquid processing agent from the positive film element P. An additional supply of sacrificial liquid may be retained by an absorbent pad 34 contained within a cylindrical spool 36 on which the positive film lement P is coiled. Thus, the strip 32 provides at least one material similar to one material of the processing agent to offset detrimental effects of the environment on the processing web. As a further measure of insuring closure of the opening 26, a wire spring 38 is provided to bias the coil of positive film element P against the inner surfaces of the chamber 20 adjacent the opening 26.

From the foregoing, as well as from the disclosures of the aforementioned U.S. Pat. No. 3,907,563 and copending application Ser. No. 747,899, it will be appreciated that the principal requirement of the negative element chamber 22 is to protect the negative film element N against exposure to light whereas the major requirement of the chamber 20 is to prevent or inhibit evaporation or contamination of the liquid processing agent of the positive film element P which is insensitive to light.

Figure 2:
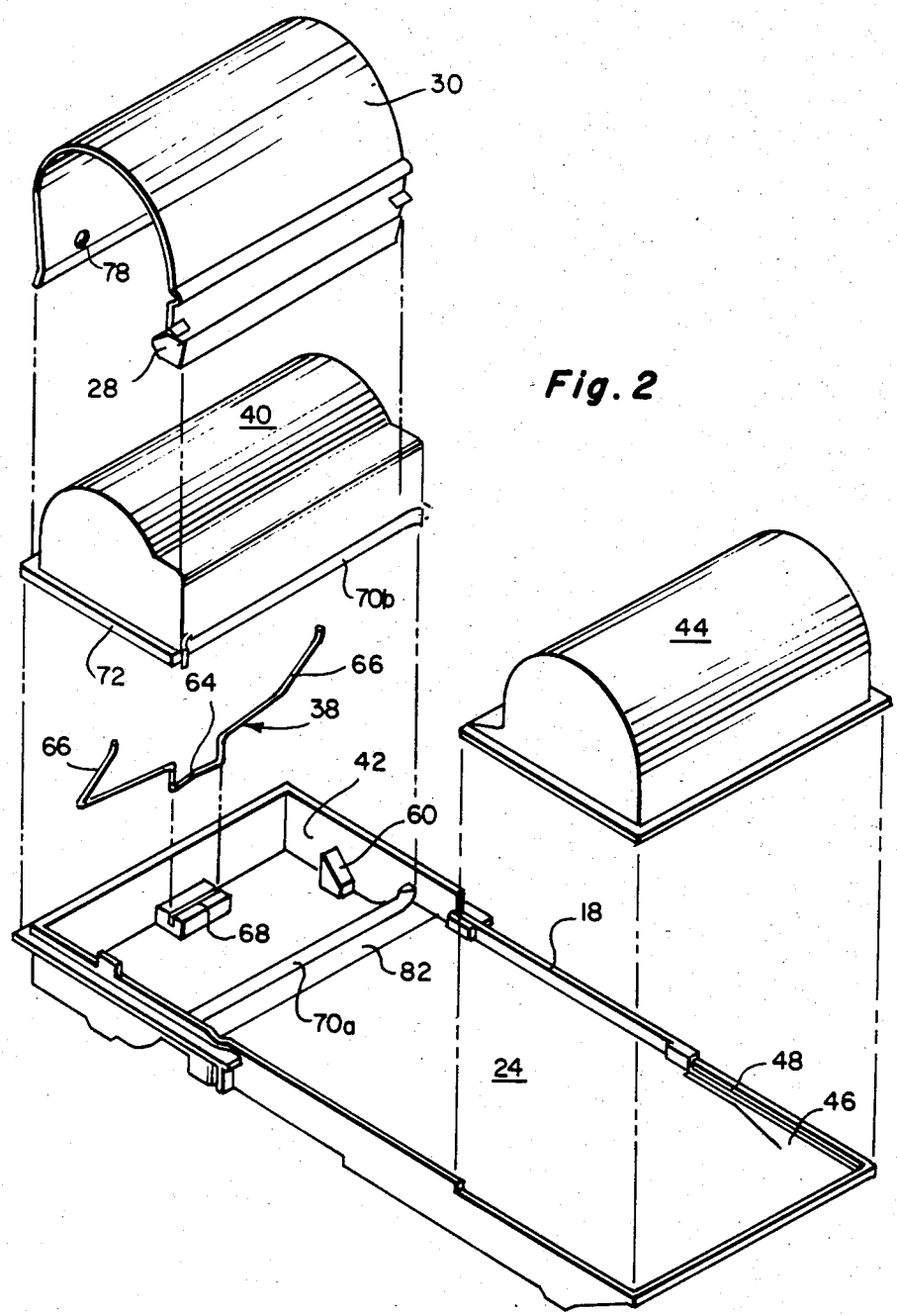
FIG. 2 is an exploded perspective view of the cassette structure illustrated in FIG. 1.
Figure 4:
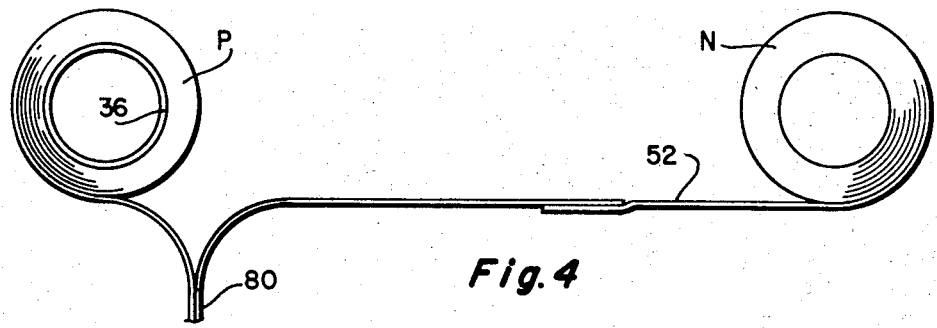
FIG. 4 is a schematic end elevation illustrating a leader connection of the two film elements adapted to be contained in the cassette of the present invention.
Figure 5:
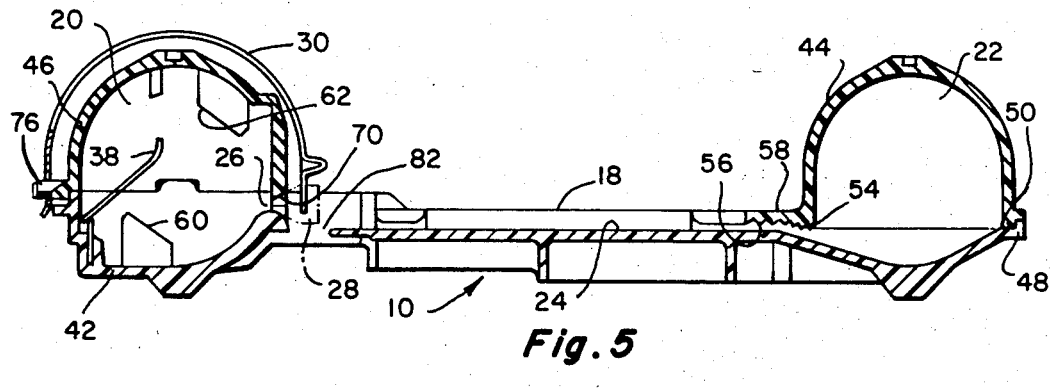
FIG. 5 is a cross-section on line 5—5 of FIG. 3.

In contrast to the construction of conventional dual housing cassettes which, for minimizing cost, are generally formed of two parts split along a plane extending parallel to and through the support 18, the present cassette is designed to accommodate separate loading of each chamber. A more complete understanding of the cassette 10 and the manner in which it separates loading of the chambers and accommodates the distinct characteristics of the two film elements N and P and permits the use of different housing materials for each, may be had by reference to FIGS. 2-5 of the drawings. From FIGS. 2 and 5, it will be seen that each of the film element chambers 20 and 22 is defined by a housing having at least two parts which are brought together to complete and close the respective chambers about the loaded film elements P and N. Specifically, the web processing or positive film chamber 20 is defined by a housing dome part 40 and a housing base part 42 whereas the negative film chamber 22 is defined by a housing dome part 44 and a housing base part 46. In the embodiment of FIGS. 1-5, both housing base parts 42 and 46 are provided as integral extensions of the tray-like support 18. The negative chamber 22 is designed to receive and contain a simple coil of the negative film elements supported at its outer periphery by the inner surfaces of the housing parts 44 and 46. As may be seen most clearly in FIG. 2, the housing base part 46 is provided with a stepped or rabbeted edge extending about two sides and the end of the part 46. The housing dome part 44, as shown most clearly in FIGS. 2 and 5, is provided with a complimentary stepped flange edge 50 to nest within and be located by the stepped lip 48 of the base part 46. Though initially separate, once the two parts 44 and 46 have been brought together, they are permanently secured such as by ultrasonic welding, solvent welding or by an appropriate adhesive. The negative coil end, as shown in FIG. 4, is wound so that a leading end portion 52 thereof may extend tangentially from the surface of the housing base part 46 through an opening 54 and onto the floor 24 of the tray 18. The opening 54 in cooperation with the film leader is rendered light-tight by a series of light diffusing angular surfaces 56 formed on a front flange extension 58 of the housing dome part 44.

From the foregoing, it will be seen that the negative film chamber 22 may be loaded in the dark with a coil of the film element N with the end portion of the element N extending through the light-tight opening 54 and along the floor 24 of the tray section of the support 18. At this time, the housing part 40 for the positive film chamber may be retained at a separate location for subsequent loading of the positive film element and closure of the positive film chamber in the light. Thus, the assembly of the support 18 and the housing part 44 with the negative film element contained in the chamber 22 may be handled as a subassembly without any danger of exposing the negative film element to light.

Figure 3:
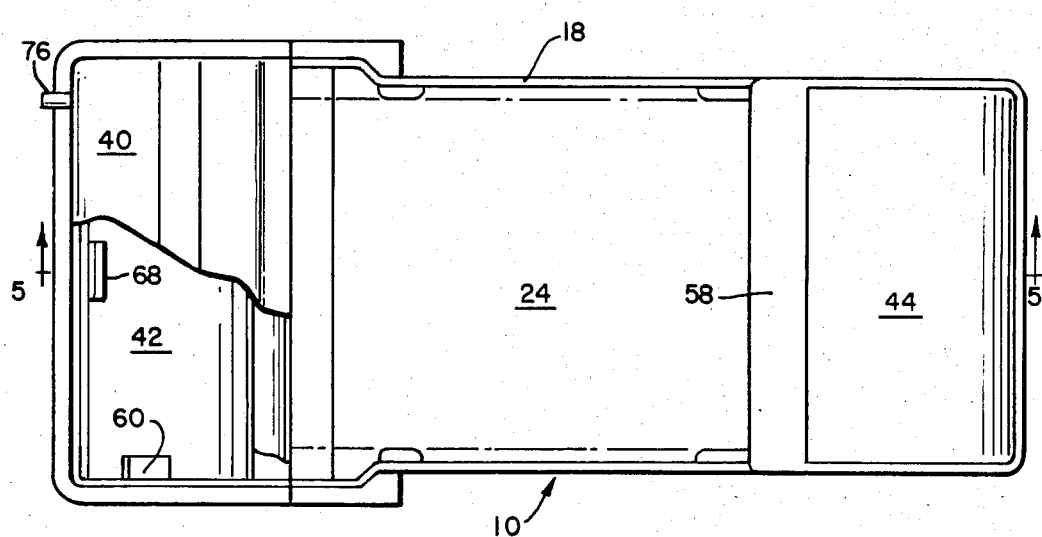
FIG. 3 is a plan view, partially cut away, of the cassette illustrated in FIG. 1.

Detailed construction of parts forming the positive film chamber 20b may be seen in FIGS. 2-3 and 5 of the drawings. To accommodate the extension of the spool 36 from opposite ends of the positive film coil and a width of the positive film element P equal to the negative element N, the axial length of the chamber 20 exceeds that of the negative chamber 22 as well as the width of the floor 24 as shown in FIGS. 2 and 3. The interior ends of the base housing part 42 include upwardly facing, forwardly inclined ramp surface formations 60. Similar but complementing formations 62 are formed at the ends of the housing part 40 so that in the assembled chamber 20, as shown in FIG. 5, inclined guideways are provided for opposite ends of the spool 36.

The spring 38 in the chamber 20 is a single spring wire bent to a generally yoke-shaped configuration to define a central mounting section 64 and a pair of spaced bearing arms 66. A slotted boss formation 68 in the housing part 42 receives the spring section 64 to retain the spring is position within the chamber 20. When so mounted, the arms 66 of the spring 38 bear yieldably against the ends of the spool 36 to bias the positive film coil in the ramp-formed guideways toward the opening 26.

As shown in FIGS. 2 and 5, the exterior surfaces about the slot opening 26 of the chamber 20 are defined by a smoothly curved, outwardly flared lip 70 to insure good sealing contact with the stopper 28. In the embodiment of FIGS. 1-5, the slot 26 and lip 70 are defined by halves of the chamber, that is, one half 70a on the base mounting part 42 and the other half 70b on the dome-like housing part 40 (FIG. 2). Thus, when the housing parts 40 and 42 are closed against each other to be oriented by complementing, stepped edges 72 and 74 about the respective end and rear margins of those parts, the slot 26 and lip 70 are established.

In the film loading operation for the positive chamber 20, the wound spool of positive film P is dropped into the base housing part 42 so that the ends of the spool 36 rest on the ramps 60. The spring 38 is then mounted in place. After a leader portion of the film element P is trained over the lip half 70a, the housing part 40 is closed on the housing part 42 and secured in place, again by ultrasonic or fusion welding or by appropriate adhesives. Thereafter, the spring 30 with the stopper 28 secured thereto, is placed about the exterior of the positive film chamber housing. In this latter respect, the housing part 40 includes a pair of spaced exterior post formations 76 (FIGS. 3 and 5) to extend through apertures 78 (FIG. 2) in the edge portion of the spring 30 opposite from the stopper 28.

With the two coils of the negative and positive film units N and P respectively packaged in the respective chambers 22 and 20, the leading end portion of the positive film element P may be extended and secured to the leading end portion 52 of the negative film element N now protected from light in the chamber 22. A creased bight 80 is then formed to extend through an opening 82 (FIG. 5) between the end of the floor 24 and the positive film chamber housing. When the loaded cartridge is inserted into a camera, the folded or creased bight portion 80 will initially extend through the rollers 12 and 14 so that the leader portion attached to both film elements P and N will be advanced as a blank photograph, severed and the system ready for the first exosure of the negative N. Although the leader connecting the two coils of film shown in FIG. 4 is illustrated as an integral extension of the positive film element P, it is contemplated that a separate leader may be used, in which case the separate leader would be affixed by appropriate adhesives to both end portions of the respective film elements P and N.

In FIG. 6 of the drawings, an alternative embodiment of the invention is shown in which parts previously identified and which are identical in this embodiment are designated by the same reference numerals, whereas parts similar in function but modified in structure are identified by the same reference numerals but primed. In this instance, the two housing parts 40' and 42' forming the positive film chamber 20 close against one another on vertically oriented parting edges. Thus, the housing part 42' is formed as a half dome and as an integral extension of the central section 18. The upper ramp formations 62 are contained in the housing part 42' whereas the lower ramp formations 60 are formed in the housing part 40' which complements the generally half cylindrical shape of the housing 42'. The parts 40' and 42' may be formed with self-sealing lip formations 84 and 86 capable of functioning in the manner of well-known container closures which effect a seal solely as a result of a mechanical interfit coupled with the sealing or resilient characteristics of the plastic fom which they are formed.

An advantage of the embodiment in FIG. 6 is that the slot opening 26' and the outwardly flared lip 70' is a single surface formation in a molded unit, thus enabling a measure of precision in the surfaces, particularly of the lip 70', greater than that possible where the lip is formed in multiple parts. Also, when the spring 30 is affixed about the two housing parts 40' and 42' (See FIG. 7) by engaging the apertures 78 over the post formations 76 and positioning the stopper 28 in the opening 26', the spring serves the functions of both retaining the stopper in sealing engagement with the lip formation 70' and retaining the two housing parts 40' and 42' in enclosed sealed relationship.

In FIG. 7, the embodiment described with respect to FIG. 6 is carried forward in a still further modified embodiment of the invention. In this instance, the two housing parts 40' and 42' are again constructed for closing on a vertical parting plane to function in the manner described with respect to FIG. 6. The entire housing defining the chamber 20, however, is initially separated from the tray section 18 and the housing parts defining the negative chamber 22. As a result of this construction, the entire packaging of the negative and the entire packaging of the positive film element P may be effected in totally unrelated operations. Importantly, the assembly of the positive film chamber, preferably including the spring and stopper as a discrete unit, separate from any cassette assembly permits use of different materials for each chamber, and separate lot sampling and stockpiling of the chambers at separate times and widely separated locations. Moreover, such separate chamber assembly permits their use in a variety of apparatus. Where a cassette is desired, the two film elements are brought together after such packaging by joining the housing defining the positive film chamber 20 to the remainder of the cassette.

To facilitate this latter operation, and for illustrative purposes only, the housing part 42' is fitted with a pair of bifurcated mounting members 88 adapted to be fitted permanently to apertured flange portions 90 at the end of the tray section 18. The mounting formations 88 and 90 may be designed in other ways, but will function to retain the housing parts 40' and 42' permanently on the tray section and remaining portion of the cassette once they are mounted.

Thus, it will be appreciated that in light of the foregoing, an extremely effective multi-part structure is provided for multi-element film systems of the type described and by which the principal objective, among others, are completely fulfilled. Also, it will be apparent to those skilled in the art from the preceeding description and accompanying drawing illustrations that modifications and/or changes may be made in the illustrated embodiments without departure from the invention. Accordingly, it is expressly intended that the foregoing description and accompanying drawings are illustrative of preferred embodiments only, not limiting, and that the true spirit and scope of the present invention will be determined by reference to the appended claims.

What is claimed is:

1. A cassette for a photographic film system, the cassette having photosensitive and processing film elements adapted for processing after exposure of the photosensitive element by face-to-face contact of both elements with each other, said cassette comprising:
   a first housing having at least two parts for defining a light-tight photosensitve film chamber when loaded with a photosensitive film element;
   a second housing having at least two parts for defining a processing film chamber when loaded with a processing element;
   said first housing having a longitudinal opening for passage of said phtosensitve film element therefrom toward said second housing; and
   said second housing having an opening for passage of said processing film element toward said second housing and into face-to-face contact with portions of said photosensitive film element extending from said first housing.

2. The cassette of claim 1, including a support having an unobstructed area at least as large as an image frame to be presented to the film system, said support carrying said first and second housings in spaced parallel relationship and being adapted to support a portion of said photosensitive film element in an exposure plane in said unobstructed area.

3. The cassette of claim 2 wherein one part of each of said first and second housings is integral with said support, and wherein the respective openings for each of said first and second housing are defined between the two parts thereof.

4. The cassette of claim 2 wherein at least one of said housings includes means for attachment thereof to said support.

5. The cassette of claim 2 wherein said support comprises a tray-like structure having a floor to support said photosensitive film element in an exposure plane, said floor terminating short of said second housing to define an opening through which said film elements are passed in face-to-face contact for processing, and said first housing comprises a base part secured as an integral extension of said support means and a dome part closable on said base part.

6. The cassette of claim 1, including leader means interconnecting the ends of said photosensitive and processing film elements, and said leader means includes a folded bight portion for advancing both said elements from their repective housings.

7. A method of asembling a film cassette of the type having a pair of film chambers, each having a longitudinal opening therein for passage of film therethrough, in fixed parallel relation at opposite ends of a tray member which defines a film plane for presentation of, and frame-by-frame exposure of, a photosensitive film strip retained within one of said chambers, the method comprising the steps of:

loading a photosensitive film strip in the dark as a roll within a light impervious film strip housing having a longitudinal opening configured for passage of a leading end of the film strip;

loading a processing web in the light as a roll within a moisture impervious web housing having a longitudinal opening configured for passage of a leading end of the web;

affixing the loaded film housing and loaded web housing together in the light at opposite ends of a tray member; and bringing the leading end of the film strip and the web into face-to-face contact at a given location at one end of said tray member to facilitate advancement of both said film strip and web in face-to-face contact within a photographic apparatus.

8. A method of asembling a film cassette of the type having a pair of film chambers, one of said chambers carrying a photosensitive film strip and the other of said chambers carrying a processing web, each chamber having a longitudinal opening therein for passage of film therethrough, mounted in fixed parallel relation at opposite ends of a tray member which defines a film plane for presentation of, and frame-by-frame exposure of, the photosensitive film strip retained within said one chamber, the method comprising the steps of:

loading a photosensitive film strip in the dark as a roll within a light impervious housing joined at one end of a tray member, said housing having a longitudinal opening configured for passage of a leading end of said film strip to said tray member;

loading a processing web in the light as a roll within a moisture impervious web housing having a longitudinal opening configured for passage of a leading end of the web;

affixing the loaded web housing to said tray member; and bringing the leading end of said film strip and the web into face-to-face contact at a given location at one end of said tray member to facilitate advancement of both said film strip and web in face-to-face contact within a photographic appartus.

9. A film chamber for mounting in or connection to other elements in photographic apparatus wherein a photosensitive film element is processed after exposure by bringing a photosensitive film element and a wet processing film element into face-to-face contact with each other for development of a scene image, said chamber comprising:

a longitudinally extending housing of generally cylindrical cross-section carrying a slot opening extending in a longitudinal direction along one wall portion thereof;

a coil of wet processing film mounted in said housing with a leading end of said wet processing film within said slot opening; and releasable stopper means carried by said housing for movement between a sealing position closing said opening and an open position permitting unobstructed passage of said wet processing film from said chamber, said stopper means including a spring member carrying an elongated stopper arrangement, said spring member being mounted on said housing to locate said elongated stopper in operative engagement with said slot opening and to bias said stopper arrangement into engagement with said slot opening.

10. The chamber of claim 9 wherein said housing comprises at least two sections fitted together to form the housing, and said spring element is mounted on said housing to bias said sections toward one another.

* * * * *